Figure 1:
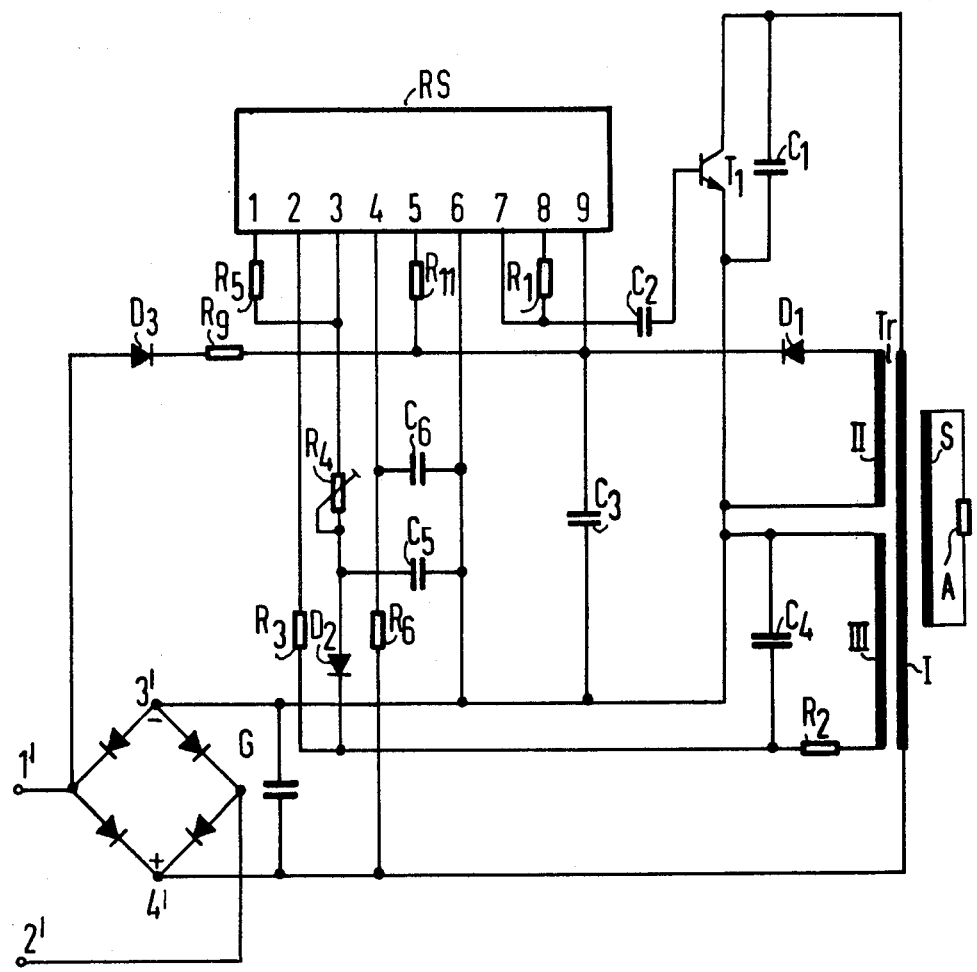

United States Patent [19]

Peruth

[11] 4,450,514
[45] May 22, 1984

[54] SWITCHED MODE POWER SUPPLY

[75] Inventor: Günther Peruth, Munich, Fed. Rep. of Germany

[73] Assignee: Siemens Aktiengesellschaft, Berlin and Munich, Fed. Rep. of Germany

[21] Appl. No.: 294,431

[22] Filed: Aug. 20, 1981

[30] Foreign Application Priority Data

Aug. 25, 1980 [DE] Fed. Rep. of Germany ....... 3032034

[51] Int. Cl.$^3$ .......................................... H02P 13/20
[52] U.S. Cl. ........................................ 363/37; 363/49
[58] Field of Search ....................... 363/37, 49, 20, 21, 363/80, 97

[56] References Cited

U.S. PATENT DOCUMENTS 4,017,787 4/1977 Hara et al. ............................ 363/49

FOREIGN PATENT DOCUMENTS 2417628 10/1975 Fed. Rep. of Germany ........ 363/37
2638225 3/1978 Fed. Rep. of Germany ........ 363/49

OTHER PUBLICATIONS

Grundig Tech. Info. (Germany), vol. 28, No. 4, (1981).
IBM Technical Disclosure Bulletin, vol. 19, No. 3, pp. 978, 979, Aug. 1976.
German Periodical, "Funkschau", (1975), No. 5, pp. 40 to 44.

Primary Examiner—William H. Beha, Jr.
Attorney, Agent, or Firm—Herbert L. Lerner; Laurence A. Greenberg

[57] ABSTRACT

Semiconductor circuit for supplying power to electrical equipment includes a control circuit with a first terminal for reference voltage connected, via a voltage divider formed of series connected resistances, to the anode of a diode; a second terminal for zero-crossing identification connected via a resistance to the cathode of the diode; a third terminal serving as an actual value input directly connected to a divider point of the voltage divider; a fourth terminal delivering a sawtooth voltage connected via a resistance to a terminal of a transformer primary winding; a fifth terminal serving as a protective input connected via a resistance to the cathode of another diode and, via two other resistances, to the cathode of a third diode having an anode connected to an input of a rectifier circuit; a sixth terminal for a reference potential connected via a capacitor to the fourth terminal and via another capacitor to the anode of the first-mentioned diode; a seventh terminal and an eighth terminal for respectively determining a control pulse potential of and pulse-controlling a transistor both connected via a resistance to a capacitor leading to the base of the transistor; and a ninth terminal serving as a power-supply input connected both to the cathode of the other diode and, via a capacitor, to a respective terminal of two secondary windings of the transformer.

1 Claim, 3 Drawing Figures

SWITCHED MODE POWER SUPPLY

The invention relates to a blocking oscillator type switching power supply for supplying power to electrical equipment, wherein the primary winding of a transformer, in series with the emitter-collector path of a first bipolar transistor, is connected to a d-c voltage obtained by rectification of a line a-c voltage fed-in via two external supply terminals, and a secondary winding of the transformer is provided for supplying power to the electrical equipment, wherein, furthermore, the first bipolar transistor has a base controlled by the output of a control circuit which is acted upon in turn by the rectified a-c line voltage as actual value and by a setpoint transmitter, and wherein a starting circuit for further control of the base of the first bipolar transistor is provided.

Such a blocking oscillator switching power supply is described in the German periodical, "Funkschau" (1975) No. 5, pages 40 to 44. It is well known that the purpose of such a circuit is to supply electronic equipment, for example, a television set, with stabilized and controlled supply voltages. Essential for such switching power supply is a power switching transistor i.e. a bipolar transistor with high switching speed and high reverse voltage. This transistor therefore constitutes an important component of the control element of the control circuit. Furthermore, a high operating frequency and a transformer intended for a high operating frequency are provided, because generally, a thorough separation of the equipment to be supplied from the supply naturally is desired. Such switching power supplies may be constructed either for synchronized or externally controlled operation or for non-synchronized or free-running operation. A blocking converter is understood to be a switching power supply in which power is delivered to the equipment to be supplied only if the switching transistor establishing the connection between the primary coil of the transformer and the rectified a-c voltage is cut off. The power delivered by the line rectifier to the primary coil of the transformer while the switching transistor is open, is interim-stored in the transformer and then delivered to the consumer on the secondary side of the transformer with the switching transistor cut off.

In the blocking converter described in the aforementioned reference in the literature, "Funkschau" (1975), No. 5, Pages 40 to 44, the power switching transistor is connected in the manner defined in the introduction to this application. In addition, a so-called starting circuit is provided. Because several diodes are generally provided in the overall circuit of a blocking oscillator according to the definition provided in the introduction hereto, it is necessary, in order not to damage these diodes, that due to the collector peak current in the case of a short circuit, no excessive stress of these diodes and possibly existing further sensitive circuit parts can occur.

Considering the operation of a blocking oscillator, this means that, in the event of a short circuit, the number of collector current pulses per unit time must be reduced. For this purpose, a control and regulating circuit is provided. Simultaneously, a starting circuit must bring the blocking converter back to normal operation when the equipment is switched on, and after disturbances, for example, in the event of a short circuit. The starting circuit shown in the literature reference "Funkschau" on Page 42 thereof, differs to some extent already from the conventional d-c starting circuits. It is commonly known for all heretofore known blocking oscillator circuits, however, that a thyristor or an equivalent circuit replacing the thyristor is essential for the operation of the control circuit.

It is accordingly an object of the invention to provide another starting circuit. It is a further object of the invention to provide a possible circuit for the control circuit which is particularly well suited for this purpose. It is yet another object of the invention to provide such a power supply which is assured of operation over the entire range of line voltages from 90 to 270 V a-c, while the secondary voltages and secondary load variations between no-load and short circuit are largely constant.

With the foregoing and other objects in view, there is provided, in accordance with the invention, a blocking oscillator-type switching power supply for supplying power to electrical equipment wherein a primary winding of a transformer, in series with an emitter-collector path of a first bipolar transistor, is connected to a d-c voltage obtained by rectification of a line a-c voltage fed-in via two external supply terminals, a secondary winding of the transformer being connectible to the electrical equipment for supplying power thereto, the first bipolar transistor having a base controlled by the output of a control circuit acted upon, in turn, by the rectified a-c line voltage as actual value and by a setpoint transmitter, and including a starting circuit for further control of the base of the first bipolar transistor, including a first diode in the starting circuit having an anode directly connected to one of the supply terminals supplied by the a-c line voltage and a cathode connected via a resistor to an input serving to supply power to the control circuit, the input being directly connected to a cathode of a second diode, the second diode having an anode connected to one terminal of another secondary winding of the transformer, the other secondary winding having another terminal connected to the emitter of the first bipolar transmitter.

In accordance with another feature of the invention, there is provided a second bipolar transistor having the same conduction type as that of the first bipolar transistor and connected in the starting circuit with the base thereof connected to a cathode of a semiconductor diode, the semiconductor diode having an anode connected to the emitter of the first bipolar transistor, the second bipolar transistor having a collector connected via a resistor to a cathode of the first diode in the starting circuit, and having an emitter connected to the input serving to supply power to the control circuit and also connected to the cathode of the second diode which is connected to the other secondary winding of the transformer.

In accordance with a further feature of the invention, the base of the second bipolar transistor is connected to a resistor and via the latter to one pole of a first capacitor, the anode of the first diode being connected to the other pole of the first capacitor.

In accordance with an added feature of the invention, the input serving to supply power to the control circuit is connected via a second capacitor to an output of a line rectifier, the output of the line rectifier being directly connected to the emitter of the first bipolar transistor.

In accordance with an additional feature of the invention, the other secondary winding is connected at one end to the emitter of the first bipolar transistor and to a pole of a third capacitor, the third capacitor having another pole connected, on the one hand, via a resistor, to the other end of the other secondary winding and, on the other hand, to a cathode of a third diode, the third diode having an anode connected via a potentiometer to an actual value input of the control circuit and, via a fourth capacitor, to the emitter of the first bipolar transistor.

In accordance with yet another feature of the invention, the control circuit has a control output connected via a fifth capacitor to the base of the first bipolar transistor for conducting to the latter control pulses generated in the control circuit.

In accordance with a concomitant feature of the invention, there is provided a sixth capacitor shunting the emitter-collector path of the first transistor.

Other features which are considered as characteristic for the invention are set forth in the appended claim.

Although the invention is illustrated and described herein as embodied in a blocking oscillator type switching power supply, it is nevertheless not intended to be limited to the details shown, since various modifications and structural changes may be made therein without departing from the spirit of the invention and within the scope and range of equivalents of the claims.

Figure 2:
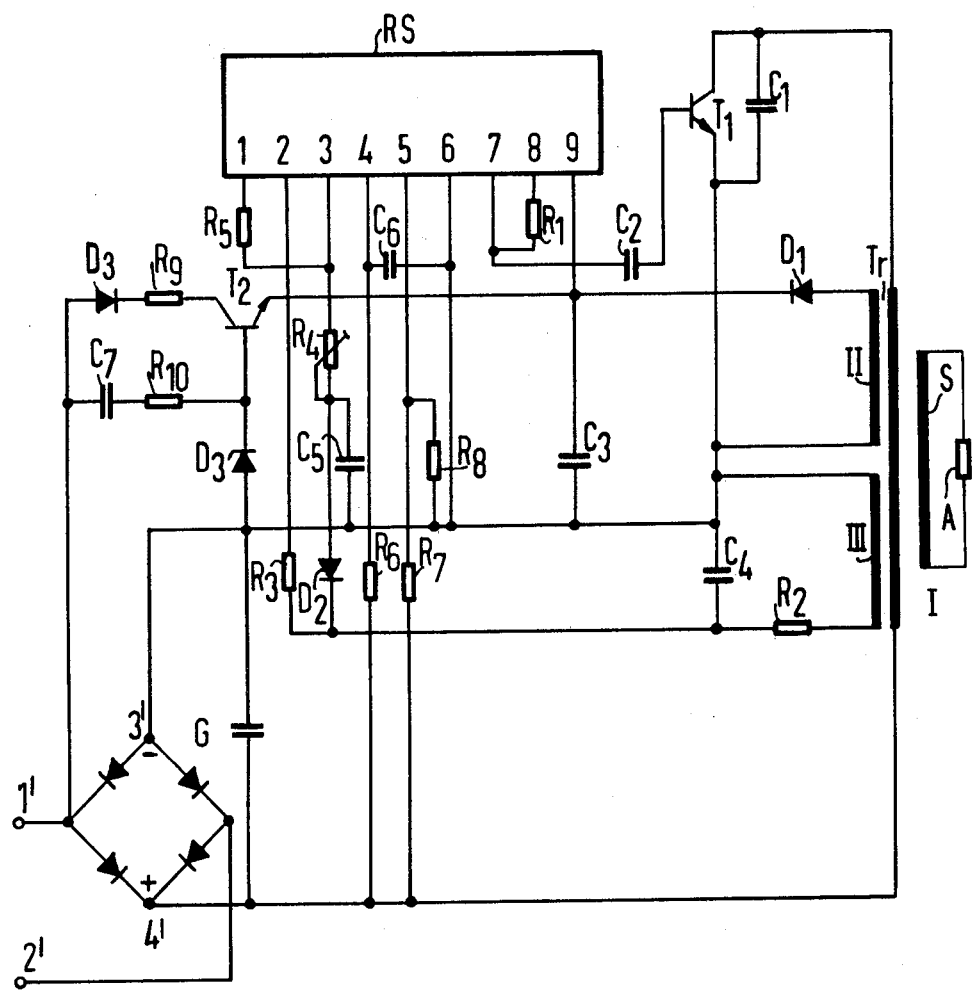
Figure 3:
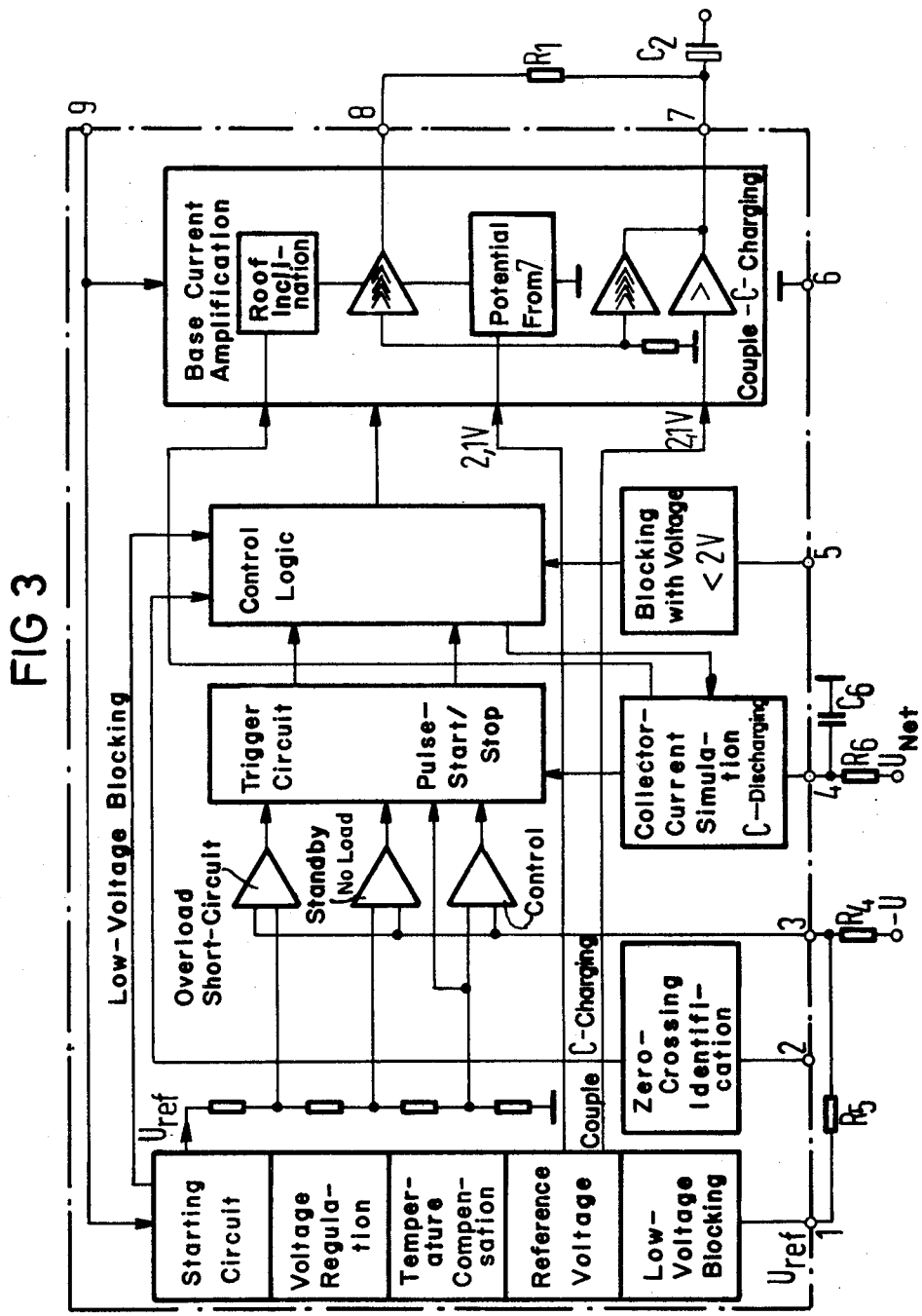

The construction and method of operation of the invention, however, together with additional objects and advantages thereof will be best understood from the following description of specific embodiments when read in connection with the accompanying drawings, in which:

FIGS. 1 and 2 are circuit diagrams of the blocking oscillator type switching power supply according to the invention; and FIG. 3 is a circuit diagram of the control unit RS of FIGS. 1 and 2.

Referring now to the drawing and, first, particularly to FIG. 1 thereof, there is shown a rectifier circuit G in the form of a bridge current, which is acted upon by a line input represented by two supply terminals $1'$ and $2'$. Rectifier outputs $3'$ and $4'$ are shunted by an emitter-collector path of an NPN power transistor $T_1$ i.e. the series connection of the so-called first bipolar transistor referred to hereinbefore with a primary winding I of a transformer Tr. Together with the inductance of the transformer Tr, the capacitance $C_1$ determines the frequency and limits the opening voltages of the switch embodied by the first transistor $T_1$. A capacitance $C_2$, provided between the base of the first transistor $T_1$ and the control output 7,8 of a control circuit RS, separates the d-c potentials of the control or regulating circuit RS and the switching transistor $T_1$ and serves for addressing this switching transistor $T_1$ with pulses. A resistor $R_1$ provided at the control output 7,8 of the control circuit RS is the negative-feedback resistor of both output stages of the control circuit RS. It determines the maximally possible output pulse current of the control circuit RS. A secondary winding II of the transformer Tr takes over the power supply of the control circuit, in steady state operation, via the diode $D_1$. To this end, the cathode of this diode $D_1$ is directly connected to a power supply input 9 of the control circuit RS, while the anode thereof is connected to one terminal of the secondary winding II. The other terminal of the secondary winding II is connected to the emitter of the power switching transistor $T_1$.

The cathode of the diode $D_1$ and, therewith, the power supply terminal 9 of the control circuits RS are furthermore connected to one pole of a capacitor $C_3$, the other pole of which is connected to the output $3'$ of the rectifier G. The capacitance of this capacitor $C_3$ thereby smoothes the positive half-wave pulses and serves simultaneously as an energy storage device during the starting period. Another secondary winding III of the transformer Tr is connected by one of the leads thereof likewise to the emitter of the first transistor $T_1$, and by the other lead thereof via a resistor $R_2$, to one of the poles of a further capacitor $C_4$, the other pole of which is connected to the first-mentioned lead of the other secondary winding III. This second pole of the capacitor $C_4$ is simultaneously connected to the output $3'$ of the rectifier circuit G and, thereby, via the capacitor $C_3$, to the cathode of the diode $D_1$ driven by the secondary winding II of the transformer Tr as well as to the power supply input 9 of the control circuit RS and, via a resistor $R_9$, to the cathode of a second diode $D_4$. The second pole of the capacitor $C_4$ is simultaneously connected directly to the terminal 6 of the control circuit RS and, via a further capacitor $C_6$, to the terminal 4 of the control circuit RS as well as, additionally, via the resistor $R_6$, to the other output $4'$ of the rectifier circuit G. The other of the poles of the capacitor $C_4$ acted upon by the secondary winding II is connected via a further capacitor $C_5$ to a node, which is connected on one side thereof, via a variable resistor $R_4$, to the terminals 1 and 3 of the control circuit RS, with the intermediary of a fixed resistor $R_5$ in the case of the terminal 1. On the other side of the node, the latter and, therefore, the capacitor $C_5$ are connected to the anode of a third diode $D_2$, the cathode of which is connected on the one hand, to the resistor $R_2$ mentioned hereinbefore and leads to the secondary winding III of the transformer Tr and, on the other hand, via a resistor $R_3$ to the terminal 2 of the control circuit RS.

The nine terminals of the control circuit RS have the following purposes or functions:

Terminal 1 supplies the internally generated reference voltage to ground i.e. the nominal or reference value required for the control or regulating process;

Terminal 2 serves as input for the oscillations provided by the secondary winding III, at the zero point of which, the pulse start of the driving pulse takes place;

Terminal 3 is the control input, at which the existing actual value is communicated to the control circuit RS, that actual value being generated by the rectified oscillations at the secondary winding III;

Terminal 4 is responsive to the occurrence of a maximum excursion i.e. when the largest current flows through the first transistor $T_1$;

Terminal 5 is a protective input which responds if the rectified line voltage drops too sharply; Terminal 6 serves for the power supply of the control process and, indeed, as ground terminal;

Terminal 7 supplies the d-c component required for charging the coupling capacitor $C_2$ leading to the base of the first transistor $T_1$;

Terminal 8 supplies the control pulse required for the base of the first transistor $T_1$; and Terminal 9 serves as the first terminal of the power supply of the control circuit RS.

Further details of the control circuit RS are described hereinbelow.

The capacity $C_3$ smoothes the positive half-wave pulses which are provided by the secondary winding II, and simultaneously serves as an energy storage device during the starting time. The secondary winding III generates the control voltage and is simultaneously used as feedback. The time delay stage $R_2/C_4$ keeps harmonics and fast interference spikes away from the control circuit RS. The resistor $R_3$ is provided as a voltage divider for the second terminal of the control circuit RS. The diode $D_2$ rectifies the control pulses delivered by the secondary winding III. The capacity $C_5$ smoothes the control voltage. A reference voltage $U_{ref}$, which is referred to ground i.e. the potential of terminal 6 is present at the terminal 1 of the control circuit RS. The resistors $R_4$ and $R_5$ form a voltage divider of the input-difference control amplifier at the terminal 3. The desired secondary voltage can be set manually via the variable resistor $R_4$. A time-delay stage $R_6/C_6$ forms a sawtooth rise which corresponds to the collector current rise of the first bipolar transistor $T_1$ via the primary winding I of the transformer Tr. The sawtooth present at the terminal 4 of the control circuit RS is limited there between the reference voltage 2 V and 4 V. The voltage divider $R_7/R_8$ (FIG. 2), brings to the terminal 5 of the control circuit RS the enabling voltage for the drive pulse at the output 8 of the control circuit RS.

The diode $D_4$, together with the resistor $R_9$ in cooperation with the diode $D_1$ and the secondary winding II, forms the starting circuit provided, in accordance with the invention. The operation thereof is as follows:

After the switching power supply is switched on, d-c voltages build up at the collector of the switching transistor $T_1$ and at the input 4 of the control circuit RS, as a function in time of the predetermined time constants. The positive sinusoidal half-waves charge the capacitor $C_3$ via the starting diode $D_4$ and the starting resistor $R_9$ in dependence upon the time constant $R_9 \cdot C_3$. Via the protective input terminal 5 and the resistor $R_{11}$ not previously mentioned and forming the connection between the resistor $R_9$ and the diode $D_1$, on the one hand, and the terminal 5 of the control circuit RS, on the other hand, the control circuit RS is biased ready for switching-on, and the capacitor $C_2$ is charged via the output 7. When a predetermined voltage value at the capacitor $C_3$ or the power supply input 9 of the control circuit RS, respectively, is reached, the reference voltage i.e. the nominal value for the operation of the control voltage RS, is abruptly formed, which supplies all stages of the control circuit and appears at the output 1 thereof. Simultaneously, the switching transistor $T_1$ is switched into conduction via the output 8. The switching of the transistor $T_1$ at the primary winding T of the transformer Tr is transformed to the second secondary winding II, the capacity $C_3$ being thereby charged up again via the diode $D_1$. If sufficient energy is stored in the capacitor $C_3$ and if the re-charge via the diode $D_1$ is sufficient so that the voltage at a supply input 9 does not fall below the given minimum operating voltage, the switching power supply then remains connected, so that the starting process is completed. Otherwise, the starting process described is repeated several times.

In FIG. 2, there is shown a further embodiment of the circuit for a blocking oscillator type switching power supply, according to the invention, as shown in FIG. 1. Essential for this circuit of FIG. 2 is the presence of a second bipolar transistor $T_2$ of the type of the first bipolar transistor $T_1$ (i.e. in the embodiments of the invention, an npn-transistor), which forms a further component of the starting circuit and is connected with the collector-emitter path thereof between the resistor $R_9$ of the starting circuit and the current supply input 9 of the control circuit RS. The base of this second transistor $T_2$ is connected to a node which leads, on the one hand, via a resistor $R_{10}$ to one electrode of a capacitor $C_7$, the other electrode of which is connected to the anode of the diode $D_4$ of the starting circuit and, accordingly, to the terminal 1' of the supply input of the switching power supply G. On the other hand, the last-mentioned node and, therefore, the base of the second transistor $T_2$ are connected to the cathode of a Zener diode $D_3$, the anode of which is connected to the output 3' of the rectifier G and, whereby, to one pole of the capacitor $C_3$, the second pole of which is connected to the power supply input 9 of the control circuit RS as well as to the cathode of the diode $D_1$ and to the emitter of the second transistor $T_2$. In other respects, the circuit according to FIG. 2 corresponds to the circuit according to FIG. 1 except for the resistor $R_{11}$ which is not necessary in the embodiment of FIG. 2, and the missing connection between the resistor $R_9$ and the cathode of the diode $D_1$, respectively, and the protective input 5 of the control circuit RS.

Regarding the operation of the starting circuit according to FIG. 2, it can be stated that the positive sinusoidal half-wave of the line voltage, delayed by the time delay stage $C_7$, $R_{10}$ drives the base of the transistor $T_2$ in the starting circuit. The amplitude is limited by the diode $D_3$ which is provided for overvoltage protection of the control circuit RS and which is preferably incorporated as a Zener diode. The second transistor $T_2$ is switched into conduction. The capacity $C_3$ is charged, via the serially connected diode $D_4$ and the resistor $R_9$ and the collector-emitter path of the transistor $T_2$, as soon as the voltage between the terminal 9 and the terminal 6 of the control circuit RS i.e. the voltage $U_9$, meets the condition $U_9 < [U_{D3} - U_{BE}(T_2)]$.

Because of the time constant $R_9 \cdot C_3$, several positive half-waves are necessary in order to increase the voltage $U_9$ at the supply terminal 9 of the control circuit RS to such an extent that the control circuit RS is energized. During the negative sine half-wave, a partial energy chargeback takes place from the capacitor $C_3$ via the emitter-base path of the transistor $T_2$ of the starting circuit and via the resistor $R_{10}$ and the capacitor $C_7$, respectively, into the supply network. At approximately ⅔ of the voltage $U_9$, which is limited by the diode $D_3$, the control circuit RS is switched on. At the terminal 1 thereof, the reference voltage $U_{ref}$ then appears. In addition, the voltage divider $R_5/R_4$ becomes effective. At the terminal 3, the control amplifier receives the voltage forming the actual value, while the first bipolar transistor $T_1$ of the blocking-oscillator type switching power supply is addressed pulsewise via the terminal 8.

Because the capacitor $C_6$ is charged via the resistor $R_6$, a higher voltage than $U_{ref}$ is present at the terminal 4 if the control circuit RS is activated. The control voltage then discharges the capacitor $C_6$ via the terminal 4 to half the value of the reference voltage $U_{ref}$, and immediately cuts off the addressing input 8 of the control circuit RS. The first driving pulse of the switching transistor $T_1$ is thereby limited to a minimum of time. The power for switching-on the control circuit RS and for driving the transistor $T_1$ is supplied by the capacitor $C_3$. The voltage $U_9$ at the capacitor $C_3$ then drops. If the voltage $U_9$ drops below the switching-off voltage value of the control circuit RS, the latter is then inactivated. The next positive sine half-wave would initiate the starting process again.

By switching the transistor $T_1$, a voltage is transformed in the secondary winding II of the transformer Tr. The positive component is rectified by the diode $D_1$, recharging of the capacitor $C_3$ being thereby provided. The voltage $U_9$ at the output 9 does not, therefore, drop below the minimum value required for the operation of the control circuit RS, so that the control circuit RS remains activated. The power supply continues to operate in the rhythm of the existing conditions. In operation, the voltage $U_9$ at the supply terminal 9 of the control circuit RS has a value which meets the condition $U_9 > [U_{D3} - U_{BE}(T_2)]$, so that the transistor $T_2$ of the starting circuit remains cut off.

For the internal layout of the control circuit RS, the construction shown, in particular, from FIG. 3 is advisable. This construction is realized, for example, in the commercially available type TDA 4600 (Siemens AG).

The block diagram of the control circuit according to FIG. 3 shows the power supply thereof via the terminal 9, the output stage being supplied directly whereas all other stages are supplied via $U_{ref}$. In the starting circuit, the individual subassemblies are supplied with power sequentially. The d-c output voltage potential of the base current gain i.e. the voltage for the terminal 8 of the control circuit RS, and the charging of the capacitor $C_2$ via the terminal 7 are formed even before the reference voltage $U_{ref}$ appears. Variations of the supply voltage $U_9$ at terminal 9 and the power fluctuations at the terminal 8/terminal 7 and at the terminal 1 of the control circuit RS are leveled or smoothed out by the voltage control. The temperature sensitivity of the control circuit RS and, in particular, the uneven heating of the output and input stages and input stages on the semiconductor chip containing the control circuit in monolithically integrated form are intercepted by the temperature compensation provided. The output values are constant in a specific temperature range. The message for blocking the output stage, if the supply voltage at the terminal 9 is too low, is given also by this subassembly to a provided control logic.

The outer voltage divider of the terminal 1 via the resistors $R_5$ and $R_4$ to the control tap U forms, via terminal 3, the variable side of the bridge for the control amplifier formed as a differential amplifier. The fixed bridge side is formed by the reference voltage $U_{ref}$ via an internal voltage divider. Similarly formed are circuit portions serving for the detection of an overload short circuit and circuit portions serving for the "standby" no-load detection, which can be operated likewise via terminal 3.

Within a provided trigger circuit, the driving pulse length is determined as a function of the sawtooth rise at the terminal 4, and is transmitted to the control logic. In the control logic, the commands of the trigger circuit are processed. Through the zero-crossing identification at input 2 in the control circuit RS, the control logic is enabled to start the control input only at the zero point of the frequency oscillation. If the voltages at the terminal 5 and at the terminal 9 are too low, the control logic blocks the output amplifier at the terminal 8. The output amplifier at the terminal 7 which is responsible for the base charge in the capacitor $C_2$, is not touched thereby.

The base current gain for the transistor $T_1$ i.e. for the first transistor in accordance with the definition of the invention, is formed by two amplifiers which mutually operate on the capacitor $C_2$. The roof inclination of the base driving current for the transistor $T_1$ is impressed by the collector current simulation at the terminal 4 to the amplifier at the terminal 8. The control pulse for the transistor $T_1$ at the terminal 8 is always built up to the potential present at the terminal 7. The amplifier working into the terminal 7 ensures that each new switching pulse at the terminal 8 finds the required base level at terminal 7.

Supplementing the comments regarding FIG. 1, it should also be mentioned that the cathode of the diode $D_1$ connected by the anode thereof to the one end of the secondary winding II of the transformer Tr is connected via a resistor $R_{11}$ to the protective input 5 of the control circuit RS whereas, in the circuit according to FIG. 2, the protective input 5 of the control circuit RS is supplied via a voltage divider $R_8$, $R_7$ directly from the output 3', 4' of the rectifier G delivering the rectified line a-c voltage, and which obtains the voltage required for executing its function. It is evident that the first possible manner of driving the protective input 5 can be used also in the circuit according to FIG. 2, and the second possibility also in a circuit in accordance with FIG. 1.

The control circuit RS which is shown in FIG. 3 and is realized in detail by the building block TDA 4600 and which is particularly well suited in conjunction with the blocking oscillator type switching power supply according to the invention has 9 terminals 1–9, which have the following characteristics, as has been explained in essence hereinabove:

Terminal 1 delivers a reference voltage $U_{ref}$ which serves as the constant-current source of a voltage divider $R_5.R_4$ which supplies the required d-c voltages for the differential amplifiers provided for the functions control, overload detection, short-circuit detection and "standby"-no load detection. The dividing point of the voltage divider $R_5$-$R_4$ is connected to the terminal 3 of the control circuit RS. The terminal 3 provided as the control input of RS is controlled in the manner described hereinabove as input for the actual value of the voltage to be controlled or regulated by the secondary winding III of the transformer Tr. With this input, the lengths of the control pulses for the switching transistor $T_1$ are determined.

Via the input provided by the terminal 2 of the control circuit RS, the zero-point identification in the control circuit is addressed for detecting the zero-point of the oscillations respectively applied to the terminal 2. If this oscillation changes over to the positive part, then the addressing pulse controlling the switching transistor $T_1$ via the terminal 8 is released in the control logic provided in the control circuit.

A sawtooth-shaped voltage, the rise of which corresponds to the collector current of the switching transistor $T_1$, is present at the terminal 4 and is minimally and maximally limited by two reference voltages. The sawtooth voltage serves, on the one hand as a comparator for the pulse length while, on the other hand, the slope or rise thereof is used to obtain in the base current amplification for the switching transistor $T_1$, via the terminal 8, a base drive of this switching transistor $T_1$ which is proportional to the collector current.

The terminal 7 of the control circuit RS as explained hereinbefore, determines the voltage potential for the addressing pulses of the transistor $T_2$. The base of the switching transistor $T_1$ is pulse-controlled via the terminal 8, as described hereinbefore. Terminal 9 is connected as the power supply input of the control circuit RS. If a voltage level falls below a given value, the terminal 8 is blocked. If a given positive value of the voltage level is exceeded, the control circuit is activated. The terminal 5 releases the terminal 8 only if a given voltage potential is present.

There are claimed:

1. Semiconductor circuit for supplying power to electrical equipment, comprising a transformer having a primary winding connected, via a parallel connection of a collector-emitter path of a transistor with a first capacitor, to both outputs of a rectifier circuit supplied, in turn, by a line a-c voltage; said transistor having a base controlled via a second capacitor by an output of a control circuit acted upon, in turn by the rectified a-c line voltage as actual value and by a reference voltage; said transformer having a first secondary winding to which the electrical equipment to be supplied is connected; said transformer having a second secondary winding with one terminal thereof connected to the emitter of said transistor and the other terminal thereof connected to an anode of a first diode leading to said control circuit; said transformer having a third secondary winding with one terminal thereof connected, on the one hand, via a series connection of a third capacitor with a first resistance, to the other terminal of said third secondary winding and connected, on the other hand, to the emitter of said transistor, the collector of which is connected to said primary winding; a point between said third capacitor and said first resistance being connected to the cathode of a second diode; said control circuit having nine terminals including a first terminal delivering a reference voltage and connected, via a voltage divider formed of a third and fourth series-connected resistances, to the anode of said second diode; a second terminal of said control circuit serving for zero-crossing identification being connected via a fifth resistance to said cathode of said second diode; a third terminal of said control-circuit serving as actual value input being directly connected to a divider point of said voltage divider forming said connection of said first terminal of said control circuit to said anode of said second diode; a fourth terminal of said control circuit delivering a sawtooth voltage being connected via a sixth resistance to a terminal of said primary winding of said transformer facing away from said transistor; a fifth terminal of said control circuit serving as a protective input being connected, via a seventh resistance to the cathode of said first diode and, through the intermediary of said seventh resistance and an eighth resistance, to the cathode of a third diode having an anode connected to an input of said rectifier circuit; a sixth terminal of said control circuit carrying said reference potential and being connected via a fourth capacitor to said fourth terminal of said control circuit and via a fifth capacitor to the anode of said second diode; a seventh terminal of said control circuit establishing a potential for pulses controlling said transistor being connected directly and an eighth terminal of said control circuit effecting pulse control of the base of said transistor being connected through the intermediary of a ninth resistance to said first capacitor leading to the base of said transistor; and a ninth terminal of said control circuit serving as a power supply input of said control circuit being connected both to the cathode of said first diode as well as via the intermediary of a sixth capacitor to a terminal of said second secondary winding as well as to a terminal of said third secondary winding.

* * * * *